(12) United States Patent
Carpenedo

(10) Patent No.: US 9,795,084 B2
(45) Date of Patent: Oct. 24, 2017

(54) ATTACHMENT SYSTEM FOR A HARVESTER HEADER

(71) Applicant: AGCO do Brasil, Hesston, KS (US)

(72) Inventor: Marcelo Carpenedo, Canoas (BR)

(73) Assignee: AGCO do Brasil, Canoas (BR)

( * ) Notice: Subject to any disclaimer, the term of this patent is extended or adjusted under 35 U.S.C. 154(b) by 36 days.

(21) Appl. No.: 14/960,700

(22) Filed: Dec. 7, 2015

(65) Prior Publication Data

US 2016/0165796 A1   Jun. 16, 2016

(30) Foreign Application Priority Data

Dec. 12, 2014   (GB) .................................. 1422157.6

(51) Int. Cl.
*A01B 51/00* (2006.01)
*A01D 41/16* (2006.01)
*A01B 59/06* (2006.01)

(52) U.S. Cl.
CPC ............ *A01D 41/16* (2013.01); *A01B 59/064* (2013.01)

(58) Field of Classification Search
CPC ........ A01D 41/16; A01D 41/12; A01D 41/14; A01D 41/145; A01B 59/062; A01B 59/006; B62D 49/065; B60D 1/04
USPC ......................................................... D15/28
See application file for complete search history.

(56) References Cited

U.S. PATENT DOCUMENTS

| | | | |
|---|---|---|---|
| 3,324,637 A * | 6/1967 | Windsor | A01D 41/16 56/15.6 |
| 3,431,711 A * | 3/1969 | Claas | A01D 41/12 56/14.5 |
| 3,488,930 A * | 1/1970 | Feldmann | A01D 41/16 56/11.9 |
| 3,498,638 A * | 3/1970 | Magruder | A01B 59/062 172/272 |
| 3,561,789 A * | 2/1971 | Stikeleather | A01B 59/062 172/272 |
| 3,977,698 A * | 8/1976 | von Allworden | B60D 1/04 172/272 |
| 4,018,451 A * | 4/1977 | Geisthoff | B60D 1/141 172/439 |
| 4,050,715 A * | 9/1977 | von Allworden | B60D 1/04 280/508 |

(Continued)

FOREIGN PATENT DOCUMENTS

FR   3023216 A1 *   1/2016   ............... B60D 1/04
JP   H01191602 A    8/1989

OTHER PUBLICATIONS

Intellectual Property Office, International Search Report for priority Application No. GB1422157.6, dated May 29, 2015.

*Primary Examiner* — Arpad Fabian-Kovacs

(57) ABSTRACT

An attachment mechanism for effecting a load-bearing interconnection between a header and a feederhouse of a self-propelled harvester is provided. The mechanism has a hook element secured to one of the header and feederhouse, the hook element having a limb defining an edge of a jaw opening with a inwardly tapering edge for longitudinally aligning and receiving a transverse pin secured to the other of the header and feederhouse. The limb has a non-vertical face configured to engage the other of the header and feederhouse and align such in the transverse direction as the feederhouse is lifted to engage the pin and jaw opening.

7 Claims, 5 Drawing Sheets

(56) References Cited

U.S. PATENT DOCUMENTS

| | | | | |
|---|---|---|---|---|
| 4,090,725 A * | 5/1978 | Perin | A01B 59/062 | 172/272 |
| 4,147,374 A * | 4/1979 | Jeffes | B60D 1/04 | 280/478.1 |
| 4,176,727 A * | 12/1979 | Perin | A01B 59/062 | 172/125 |
| 4,280,317 A * | 7/1981 | Lindblom | A01D 41/16 | 56/15.6 |
| 4,398,745 A * | 8/1983 | Azzarello | B60D 1/04 | 280/508 |
| 4,707,972 A * | 11/1987 | Knepper | A01D 41/14 | 460/16 |
| D299,239 S * | 1/1989 | Henningsen | D15/28 | |
| D299,240 S * | 1/1989 | Henningsen | D15/28 | |
| 4,802,686 A * | 2/1989 | Isreal | B60D 1/363 | 280/477 |
| 4,887,680 A * | 12/1989 | Nozaka | A01B 71/063 | 172/272 |
| 5,303,790 A * | 4/1994 | Coleman | A01B 71/063 | 172/272 |
| 5,657,825 A | 8/1997 | Englund | | |
| 6,062,319 A * | 5/2000 | Schwalenberg | A01B 59/06 | 172/272 |
| 6,178,669 B1 * | 1/2001 | Quenzi | E01H 5/06 | 172/275 |
| 6,519,923 B1 * | 2/2003 | Cooksey | A01B 71/08 | 56/14.9 |
| 6,619,020 B1 * | 9/2003 | Chaney | A01D 41/142 | 56/10.9 |
| 6,735,929 B2 * | 5/2004 | Watts | A01D 41/16 | 56/14.9 |
| 7,575,077 B2 * | 8/2009 | Priepke | A01B 71/063 | 172/272 |
| 9,137,946 B2 * | 9/2015 | Verhaeghe | A01D 41/16 | |
| 2005/0012305 A1 * | 1/2005 | Wood, Jr. | B60D 1/141 | 280/508 |
| 2006/0055140 A1 * | 3/2006 | Trefz | A01B 71/063 | 280/100 |
| 2008/0271425 A1 * | 11/2008 | Ricketts | A01D 41/16 | 56/15.6 |
| 2012/0102905 A1 | 5/2012 | Dold | | |
| 2012/0298387 A1 * | 11/2012 | Sauermann | A01B 59/006 | 172/272 |
| 2012/0317951 A1 * | 12/2012 | Vereecke | A01D 41/16 | 56/14.9 |

\* cited by examiner

ATTACHMENT SYSTEM FOR A HARVESTER HEADER

FIELD OF THE INVENTION

The invention relates to an attachment mechanism for effecting a load-bearing interconnection between a header and feederhouse of a self-propelled harvester.

BACKGROUND OF THE INVENTION

To enable self-propelled harvesting machines to be transported on the highway it is well known to provide a detachable connection between the header and the front side of a feederhouse. The attachment mechanics typically include a load-bearing interconnection configured to allow the header to be engaged and lifted by the feederhouse without manual intervention. In most cases this connection includes a pair of hook elements which engage respectively cooperating transverse pins or members. Latching or locking of the mechanism typically takes place as a subsequent step either manually or automatically with actuators.

To ensure accurate alignment of the feederhouse opening with the corresponding header discharge opening the attachment process generally relies on the skill of the operator as the harvester is driven into position to lift the header from the trailer or from the ground. Alignment in both the transverse and longitudinal directions is demanded and it is known to provide, for example, flared openings to assist in the alignment of hooks and pins.

SUMMARY OF THE INVENTION

In accordance with one aspect of the invention, there is provided an attachment mechanism for effecting a load-bearing interconnection between a header and a feederhouse of a self-propelled harvester, the harvester defining a longitudinal direction parallel to the normal path of travel of the harvester and a transverse direction horizontally perpendicular to the normal path of travel, the mechanism comprising a hook element secured to one of the header and feederhouse, the hook element comprising a limb defining an edge of a jaw opening with a inwardly tapering edge for longitudinally aligning and receiving a transverse pin secured to the other of the header and feederhouse, the limb having a non-vertical face configured to engage the other of the header and feederhouse and align such in the transverse direction as the feederhouse is lifted to engage the pin and jaw opening.

It should be understood that the term "longitudinal" refers to a direction parallel with the main axis of the machine or in a direction parallel with the normal forward direction of travel of the harvester. The term "transverse" refers to a horizontal direction perpendicular to the normal forward direction of travel. The terms "transverse", "longitudinal" and "vertical" can be considered as the x, y, z axes of a Cartesian system.

The limb defines both:
a) a flared opening for longitudinal alignment of a pin or other transverse member; and,
b) a non-vertical face which serves as means to transversely align the feeder house and header as the former is lifted in to an operative position, Therefore, dual direction guidance is provided with a single component.

The hook element may comprise a pair of limbs extending either side of the jaw opening and each limb having a non-vertical face to provide the transverse alignment means. Furthermore, both limbs may define a flared opening to the jaw, thereby providing longitudinal alignment means.

In a preferred embodiment the hook element comprises a metal plate having a longitudinal bend axis between the jaw opening and the non-vertical face or faces. The hook element may be formed by laser cutting to define the flared jaw opening before bending to define the non-vertical face.

The attachment mechanism may be embodied in a harvesting header of any type including cereal headers, corn headers and pick-up headers by way of example. When embodied on the header the jaw opening of each attachment mechanism is directed downwardly to enable a pin or transverse member associated with the header to engage with the jaw opening from below.

Such a header preferably comprises a pair of said hook elements secured to header frame in a transversely spaced relationship, wherein the non-vertical faces of the respective hook elements are inclined to the vertical in opposite directions so as to centre the header with respect to the feeder house in the transverse direction.

Alternatively, the hook elements may be associated with the feederhouse with the jaw openings being directed upwardly to engage pins or transverse members associated with the header.

In a header attachment system embodying the attachment mechanism both the harvesting header and the feederhouse comprise a component of the mechanism. In a preferred embodiment the non-vertical face forms a first alignment plate, the system further comprising said transverse pin and a second alignment plate secured to the other of the header and feederhouse, the first and second alignment plate being mutually parallel to a plane having a normal axis inclined with respect to horizontal and longitudinal vertical planes and residing in a transverse vertical plane, the first and second alignment plates configured to come into mutual sliding contact, the sliding contact being associated with a transverse alignment shifting of the header with respect to the feederhouse. The pin or transverse member is preferably secured to the other of the header and feederhouse by a pair of transversely spaced longitudinal vertical parallel plates. The second alignment plate is preferably integral with one of the parallel plates and is joined along a top edge thereof either by welding or bending.

The first alignment plate is preferably positioned between the parallel plates when the header is attached to the feederhouse. Preferably further still the transverse dimension of the first alignment plate may substantially correspond to the spacing of the parallel plates to inhibit transverse movement between the header and feeder house.

BRIEF DESCRIPTION OF THE DRAWINGS

Advantages of the invention will become apparent from reading the following description of a specific embodiment with reference to the appended drawings, in which.

DETAILED DESCRIPTION OF THE DRAWINGS

Figure 1:
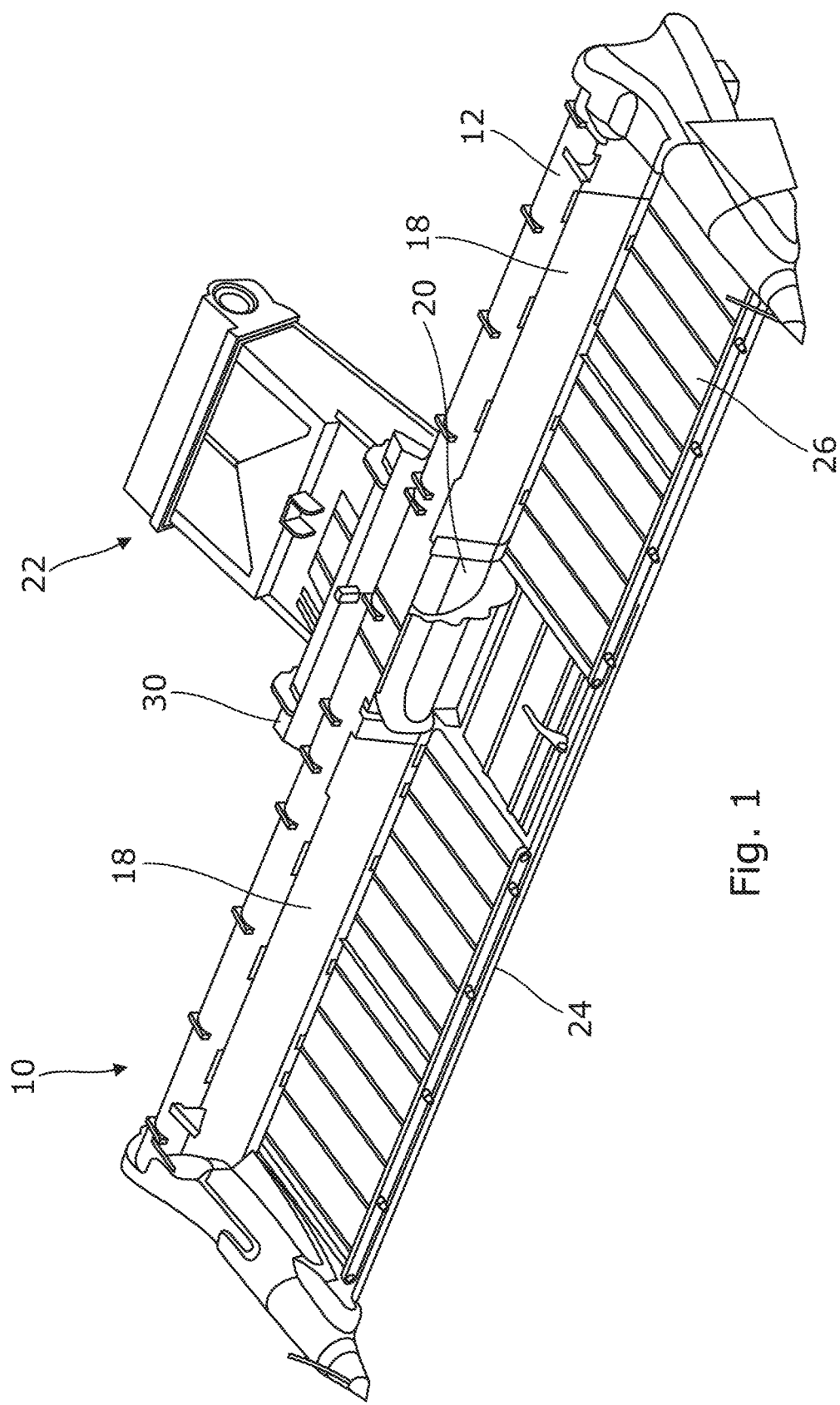
FIG. 1 is a front top left perspective view of a header and feederhouse embodying an attachment mechanism in accordance with the invention, the reel of the header being omitted for clarity.
Figure 2:
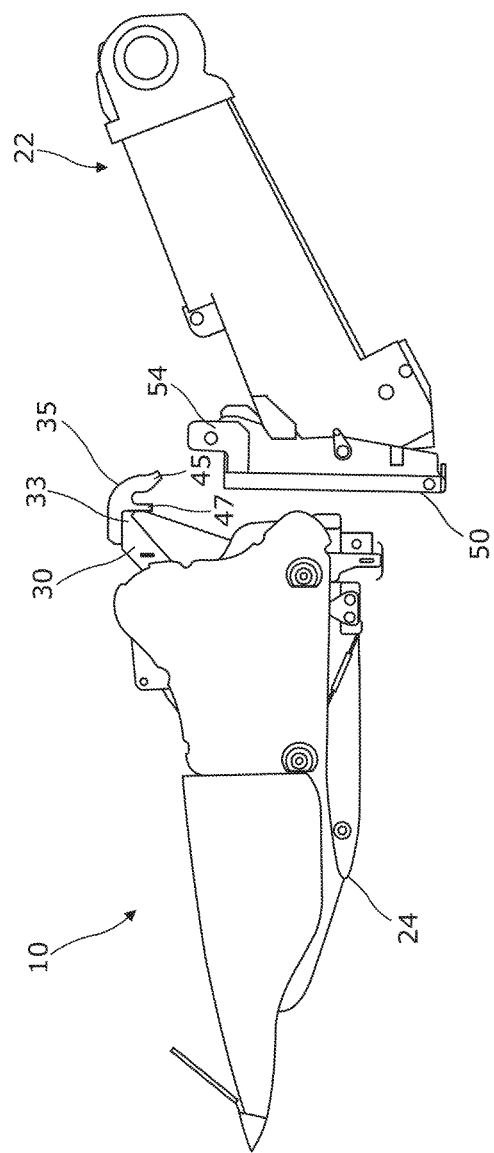
FIG. 2 shows a left elevation view of the header and feederhouse of FIG. 1 showing the header detached from the feederhouse.
Figure 3:
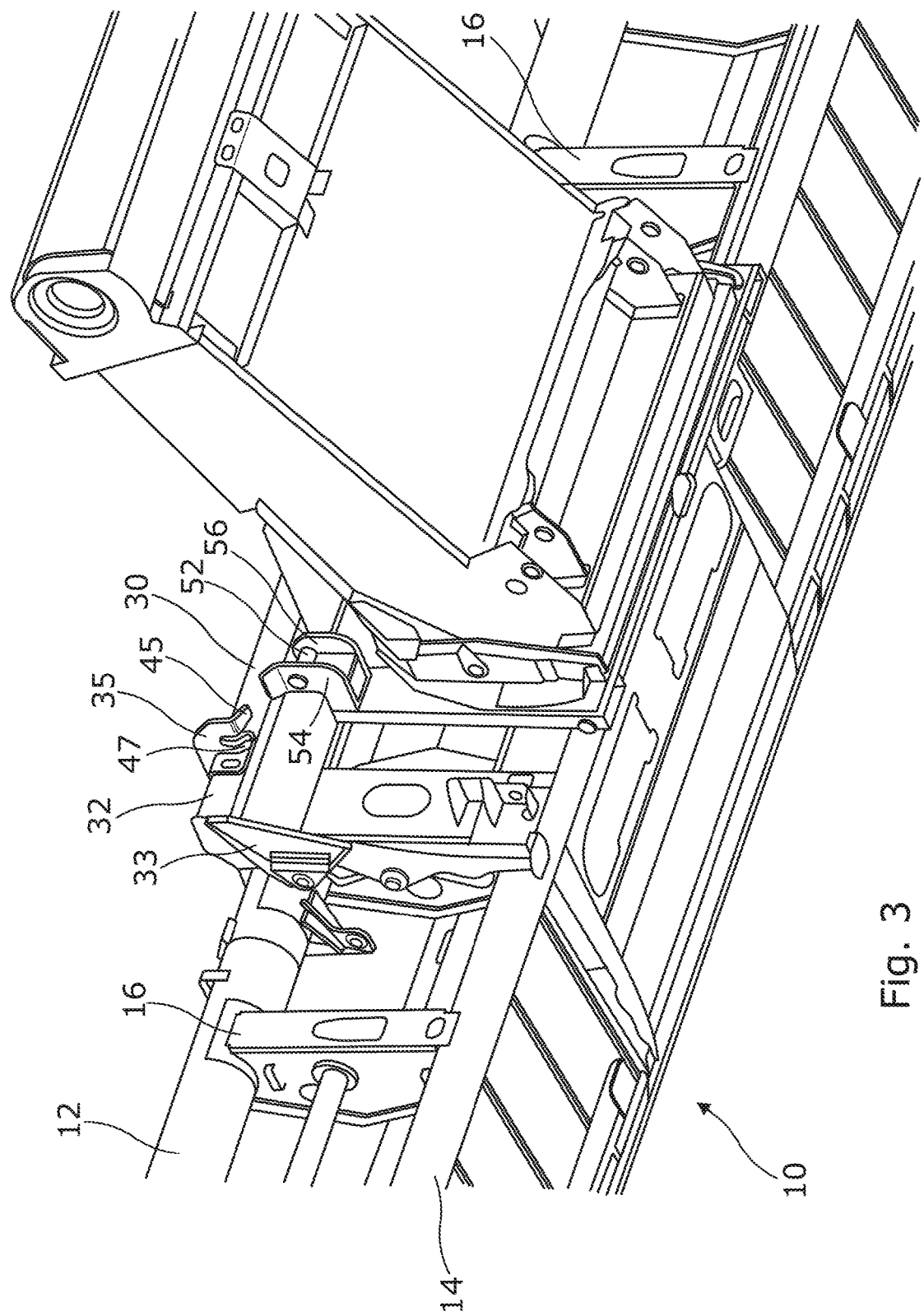
FIGS. 3 and 4 is a bottom left rear perspective view and a rear elevation of the header of FIG. 1 detached from the feederhouse.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

With reference to the drawings a harvesting header 10 has a frame at the rear thereof that includes an upper beam assembly 12 extending across the entire width of header 10, and a lower beam assembly 14 that likewise extends across the full width of header 10. A number of upright channels 16 interconnect beam assemblies 12, 14 across the backside of header 10 at spaced locations there across.

Upright rear panels 18 on the front sides of channel 16 define an upright rear wall of the header, while a centrally located opening 20 in such panels serves as a crop discharge outlet from header 10 to the feederhouse 22 upon which header 10 is detachably mounted.

The header 10 in the example illustrated is a cereal header with a leading cutterbar 24 and a draper belt assembly 26 for conveying cut crop material to the central opening 20. However, it should be understood that the invention is applicable to many different types of header including corn headers and pick-up headers by way of example.

Header 10 is adapted for attachment to the feederhouse 22 through the provision of an adapter frame or bracket 30 that is permanently attached to the rear of header frame in a generally surrounding relationship to outlet opening 20. Adapter bracket 30 is of rectangular, open boxlike construction, presenting a horizontally extending top beam 32 which is attached to upper beam assembly 12 by a pair of transversely spaced brackets 33.

Attached to the top beam 32 are a pair of hook elements 35 positioned in a transversely spaced relationship and each being formed from steel plate aligned substantially within a vertical longitudinal plane. The following description of the attachment mechanism will focus on a single (the left-hand) hook element. However, it shall be understood that the description also applies to the right-hand hook element.

Figure 5:
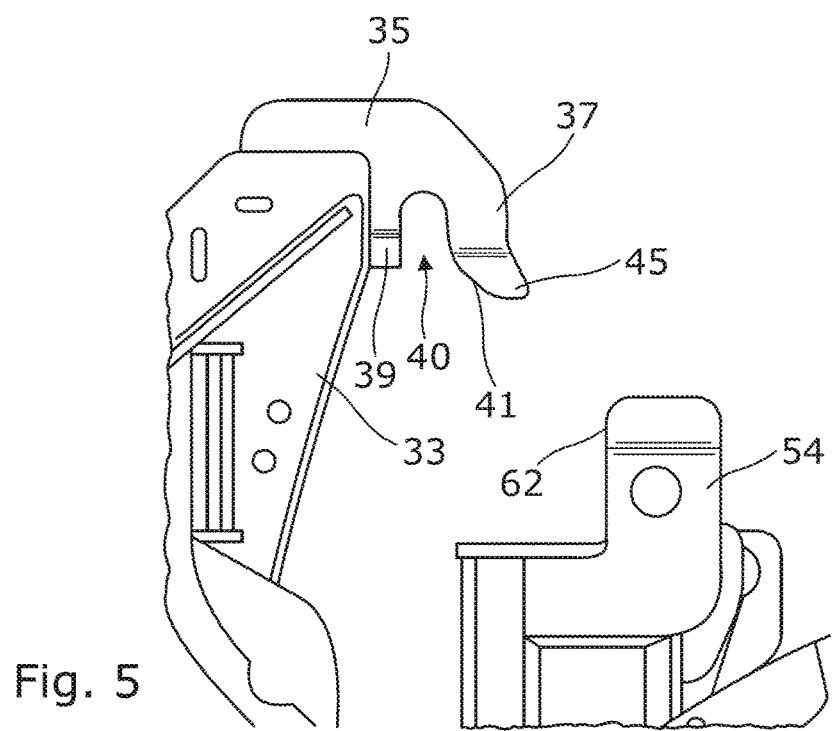
FIG. 5 shows a close-up left elevation view of the attachment mechanism in a detached mode, and, FIG. 6 shows a top left rear perspective close-up view of the attachment mechanism in the operable (attached) mode.

Best seen in FIG. 5 hook element 35 comprises a pair of downwardly projecting limbs 37, 39 defining a jaw opening 40 therebetween. Rear limb 37 comprises an inwardly tapering edge 41 which effectively forms a flared entrance to jaw opening 40.

Figure 4:
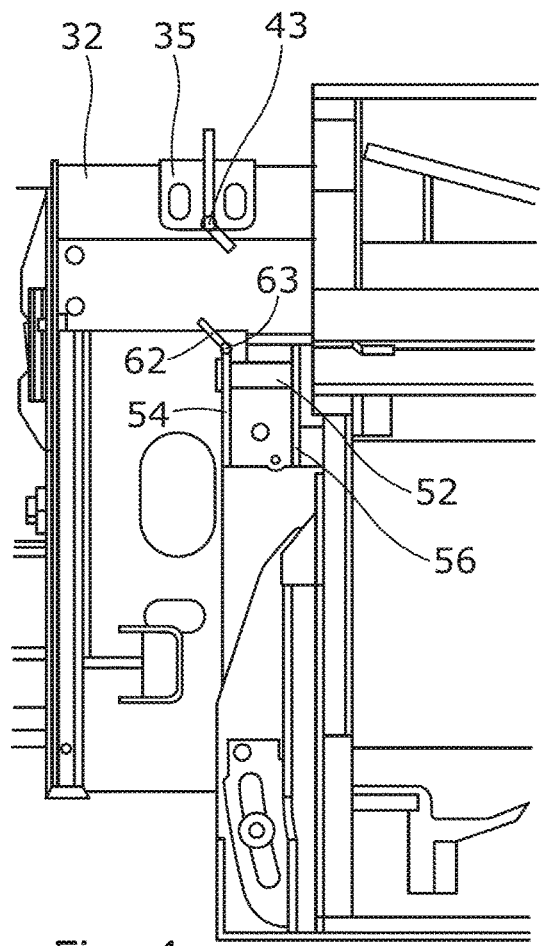

Viewed from behind in FIG. 4 the hook element 35 includes a longitudinal bend axis 43 resulting in a lower extremity of both limbs 37,39 being inclined towards the longitudinal centreline of the header and providing non-vertical faces 45,47 for transverse alignment means to be described later.

Turning attention to the feederhouse 22, an attachment frame 50 is provided at the front end thereof for cooperation with the adapter frame 30 described above. Attachment frame 50 includes a rectangular boxlike construction corresponding to the crop receiving opening at the front of feederhouse 22. The frame 50 may be secured in a known manner to feederhouse 22 to permit lateral tilt or pitch adjustment.

As is common, the rear end of feederhouse 22 is pivotally mounted to the front of a harvesting machine (not shown) to permit lifting and lower of the header 10. Feederhouse 22 houses a chain and slat elevator in a known manner and for conveying cut crop material from header 10 to the processing apparatus of the harvesting machine.

A pair of transverse pins 52 are secured to the top corners of attachment frame 50 by a respective pair of vertical parallel plates 54,56. The plates 54,56 are secured to the attachment frame 50 by welding, bolting or other known measure and are transversely spaced to form a receiving socket or gap for hook element 35.

An upward extremity of outer plate 54 has an outwardly bent portion 62 defined by longitudinal bend axis 63. The inclination of bent portion 62 substantially matches that of bend portion 45 on the corresponding hook element 35 for reasons to become apparent below.

When attachment of the header 10 is required the harvester is driven up to the header. Feederhouse 22 is coarsely transversely aligned and set at an appropriate height so that pins 52 are positioned below hook element 35 as shown in FIGS. 2 to 5. The harvester is driven forward until the attachment frame 50 abuts the adapter frame 30 of header, or is at least in close proximity, with the pin 52 below jaw opening 40. The feederhouse 22 is then lifted so that the respective pins 52 engage into the associate corresponding jaw openings 40. As the pins 52 reach the upper limit of jaw openings 40 continued lifting of the feederhouse 22 lifts the header 10 with the hook elements 35 and pins 52 bearing the weight thereof.

An aspect of the invention involves the simple manner in which transverse and longitudinal guidance is provided by rear limb 37 as the feederhouse 22 is lifted as described above. In the longitudinal direction edge 41 serves to guide the pin 52 into the jaw opening 40. In the transverse direction the inclined surface 45 at the lower extremity of limb 37 comes into sliding contact with inclined portion 62 on the feederhouse 22 so as to guide the hook elements 35 inwardly towards the vehicle longitudinal centreline.

Figure 6:
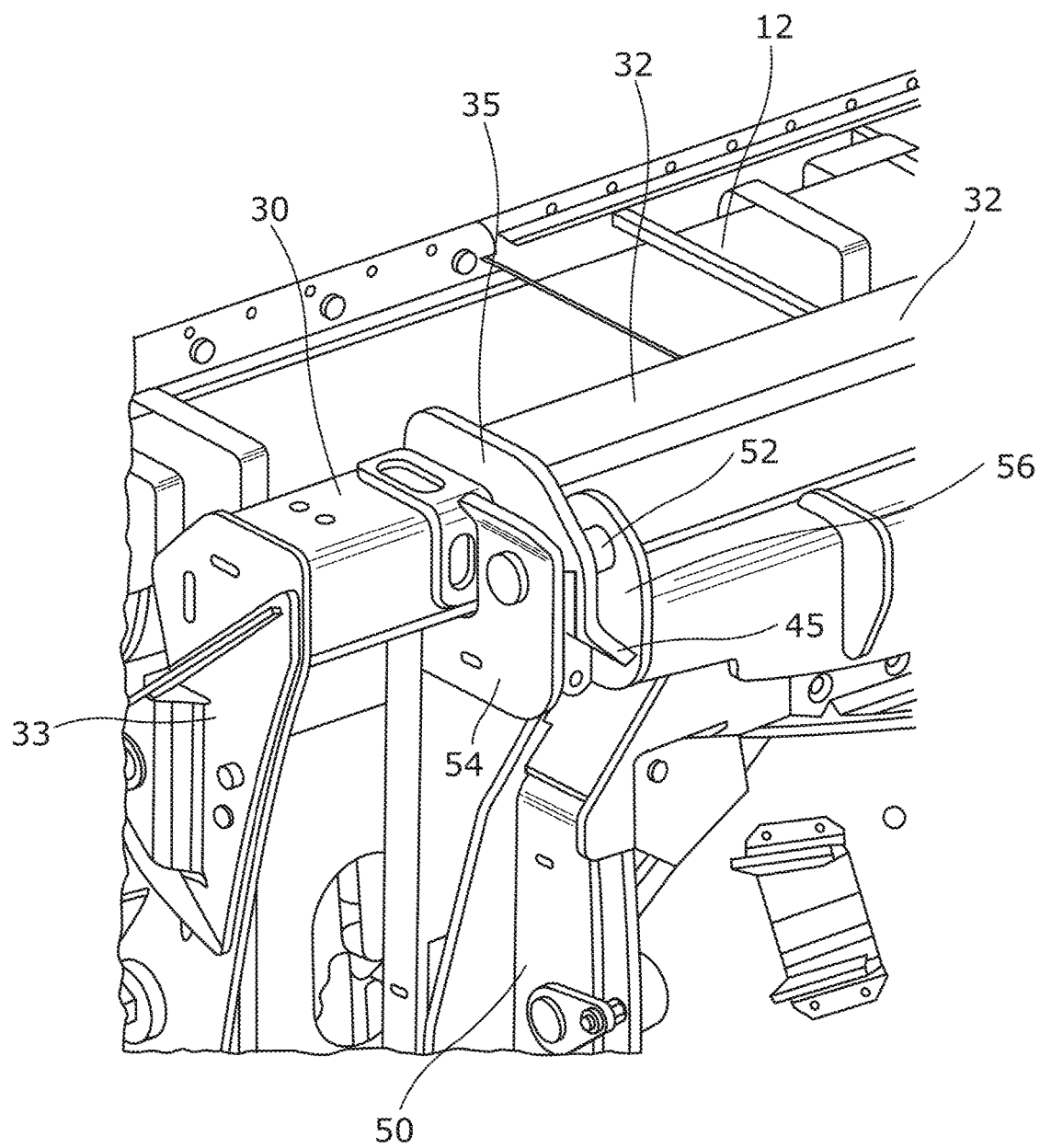

As can be seen in FIG. 6 the transverse dimension of inclined portion 45 substantially matches the transverse separation of the associated vertical plates 54, 56. In other words the inclined portion 45 nests between the outer and inner plates 54, 56 so as to lock the header in the transverse direction and prevent the hook element 35 from sliding on the pin 52.

Once the weight of the header 10 is fully borne by the feederhouse 22 further latching mechanisms, as known in the art, are engaged typically along the lower edge of the attachment frames 30, 50, either by manual operation or actuator-operated mechanisms controlled from the cab of the harvesting machine.

It should be understood by those skilled in the art that hook element 35 and pin 52 can be swapped so that the former is attached to the feederhouse 22 whilst the latter is associated with the header 10. In such an arrangement, the hook element 35 shall be inverted so as to engage pin 52 from below.

Although shown as a substantially cylindrical pin 52 it is envisaged that any transverse member which may be integral with a frame may engage a hook element without departing from the scope of the invention.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A harvesting header comprising a transverse header frame and an attachment mechanism secured to said header frame, the attachment mechanism comprising a hook element secured to the header, the hook element comprising a limb defining an edge of a downwardly-directed jaw opening with a inwardly tapering edge for longitudinally aligning and receiving a transverse pin secured to the feederhouse, the limb having a main portion and an extremity which is angled with respect to the main portion about a horizontal axis so as to form a non-vertical surface configured to engage the feederhouse and align such in the transverse direction as the feederhouse is lifted to engage the pin and jaw opening.

2. The header according to claim 1 comprising a pair of said hook elements secured to the header frame in a transversely spaced relationship, wherein the non-vertical faces of the respective hook elements are inclined to the vertical in opposite directions with respect to each other.

3. A header attachment system comprising a harvesting header having a transverse header frame, a self-propelled harvester having a feederhouse having an attachment frame, and an attachment mechanism having a hook element secured to one of the header and feederhouse, and a transverse pin secured to the other of the header and feederhouse, the hook element comprising a limb defining an edge of a jaw opening with a inwardly tapering edge for longitudinally aligning and receiving the transverse pin, the limb having a non-vertical surface configured to engage the other of the header and feederhouse and align such in the transverse direction as the feederhouse is lifted to engage the pin and jaw opening, wherein the non-vertical surface forms a first alignment plate, the system further comprising a second alignment plate secured to the other of the header and feederhouse, the first and second alignment plates being mutually parallel to a plane having a normal axis inclined with respect to horizontal and longitudinal vertical planes and residing within a transverse vertical plane, the first and second alignment plates configured to come into mutual sliding contact, the sliding contact being associated with a transverse alignment shifting of the header with respect to the feederhouse.

4. The header attachment system according to claim 3 wherein the pin is secured to the other of the header and feederhouse by a pair of transversely-spaced longitudinal vertical parallel plates.

5. The header attachment system according to claim 4, wherein the first alignment plate is positioned between the parallel plates when the header is attached to the feederhouse.

6. The header attachment system according to claim 5, wherein the second alignment plate is joined along a top edge of one of said parallel plates.

7. The header attachment system according to claim 3, wherein the hook element is secured to the header.

* * * * *